May 19, 1953   M. J. DERKOVITZ   2,638,696
FISHING DEVICE
Filed Dec. 13, 1949
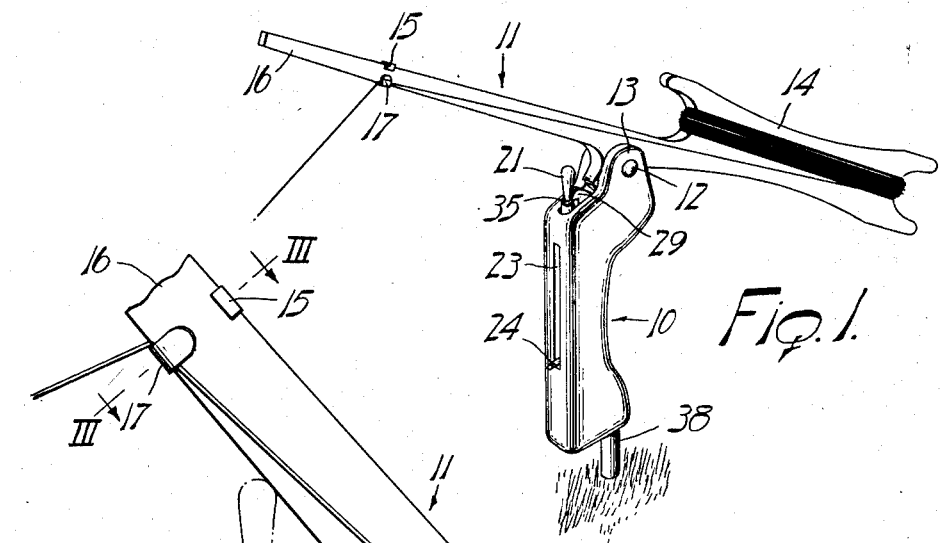
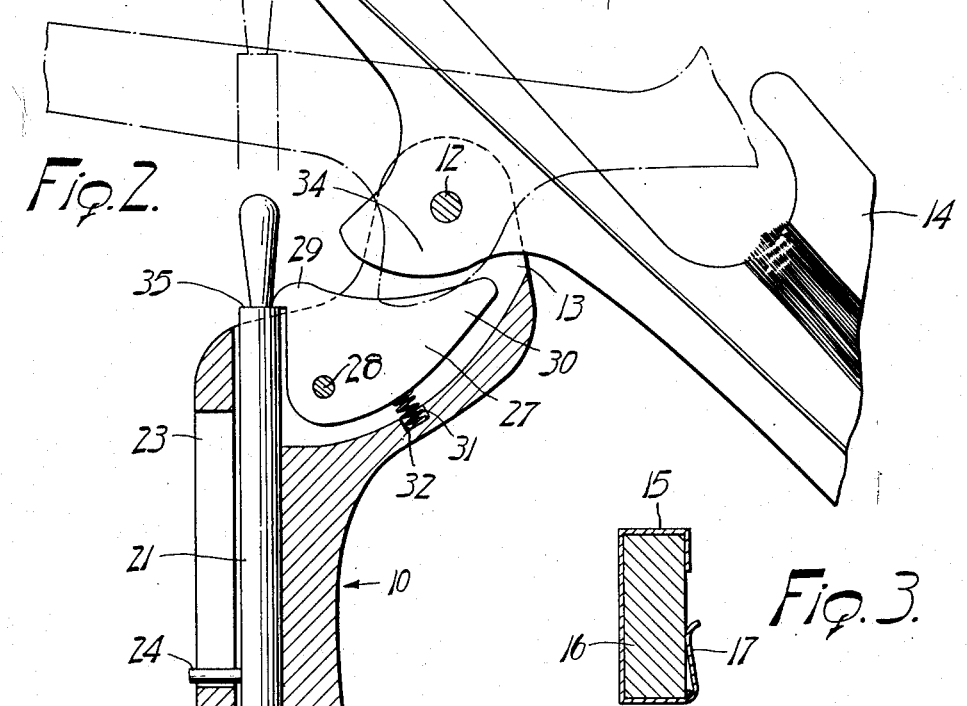
INVENTOR
Martin J. Derkovitz
BY
Bean, Brooks, Buckley & Bean.
ATTORNEYS Patented May 19, 1953

2,638,696

UNITED STATES PATENT OFFICE 2,638,696

FISHING DEVICE

Martin J. Derkovitz, Lancaster, N. Y.

Application December 13, 1949, Serial No. 132,699

3 Claims. (Cl. 43—15)

This invention relates to fishing devices and particularly to a line holding device which is useful in still fishing.

There have been proposed in the prior art fish line holding devices including a rod element, or a similar element for suspending a fish line in water, and means for supporting the rod in such manner that, when a fish strikes, the rod is moved to draw the line away from the fish, the object being to more firmly seat the hook in the mouth of the fish. The present invention provides a device of this general class, but one which operates in a novel manner and overcomes defects uniformly present in prior art proposals along this line. The present invention further provides a device which is much simpler in construction and operation than prior art devices for accomplishing similar proposals, and one which lends itself more readily to adjustment to suit varying conditions under which the devices are used.

In the device of the present invention a fish line suspending element is supported so that, within certain predetermined limits, it may pivot freely about its point of support and thus permits the line suspended thereby to move freely up and down within those limits. Means are further provided so that when, by reason of a strike, the rod is pivoted beyond the predetermined permissive range, an impact element impinges against a portion of the rod to abruptly move it to yank the fish line supported thereby in a direction away from the fish to thus instantaneously seat a fish hook firmly in the mouth of the fish.

In the devices of the prior art, latch means have been provided whereby, when a predetermined pull is exerted on the line, a spring is released to move the line in a direction away from the fish. In these devices of the prior art the rod element has been in the form of a fixed, spring latched element. This factor alone has greatly reduced the efficacy of these proposals. Further, since the mechanical unlatching of the devices of the prior art has been arranged to set a spring in motion to simultaneously move the rod, the action has been lacking in sufficient abruptness to operate effectively. The action of a spring acting upon the released rod is subject to inertia forces which cause it to start slowly at first, even though its rate of acceleration be rapid. The timing of an operation of the kind here under consideration is so critical that the spring latched rods of prior proposals have not operated with sufficient effectiveness to gain practical use.

In the device of the present invention, two of the important considerations are, first, that the rod element is free and unrestricted in its pivotal movement until it has been moved out of a normal free arc of movement by a substantial pull on the line, and, secondly, that when a substantial pull on the line brings the rod out of its normal free range of pivotal movement, an impact element is released which moves toward the rod and does not meet the same until it has moved a sufficient distance to overcome its starting inertia, so that it strikes the rod with an abrupt impact. It has been found that it is this abruptness and speed of movement of the rod when it is struck that is more important than the amount of force exerted in yanking the line.

In the fixedly latched rods of the prior art there is no freedom of movement of the rod, and the tension of the spring which restrains it is either too light, whereupon it sets off too easily, or, if heavier spring tension is provided, too great a force is required to release the attached rod. With the free movement provided in the presently proposed construction, the fish has time to fully get hold of the bait without disturbing the latch mechanism and with the rod freely pivoting. It is only when the fish makes a definite move to depart or make off with the bait, as is customary, but before he is forewarned or made wary by undue resistance in the line, that the latch device is released to strike sharply against the rod and seat the hook.

A further advantage of the device of the present invention resides in the fact that the rod and its supporting means may be readily disassembled for convenient packing and handling, both in initial packing and distribution and in subsequent actual use and transportation by fishermen, without in any way effecting or requiring disassembly and re-assembly of the spring and latch mechanism. The free movement of the rod element also permits it to be accurately balanced to suit varying conditions, either by the use of counterbalancing weights or by shifting the effective lever arm of the line by shifting its point of engagement at the outer portion of the rod, as will presently appear.

Other objects and advantages attendant upon the manufacture and use of the device of the present invention will occur to those skilled in this art. It is to be understood that various modifications may be made without departing from the spirit and scope of the invention, which is limited only as defined in the appended claims.

In the drawings:

Fig. 1 is a general perspective view of the device in a set position;

Fig. 2 is an elevational view of a fragmentary portion of the device on an enlarged scale and with portions shown in cross-section for added illustration; and Fig. 3 is a cross-sectional view on the line 3—3 of Fig. 2 showing an adjustable line supporting element.

Like characters of reference denote like parts in the several figures and the numeral 10 designates generally a holder element which is preferably shaped to provide a convenient hand gripping formation about its intermediate portion. A pivoted rod or fish line suspending element is designated generally 11 and is pivoted at an intermediate point to the upper end of holder 10 as at 12, the upper end of holder 10 being bifurcated as at 13 to receive the pivot portion of rod 11 and for other purposes, as will presently appear.

The inner end of rod 11 may be provided with a line winding formation 14 as shown in Fig. 1, the fish line therefrom extending outwardly and being supported in a clip 15 which is frictionally slidable along outer end portion 16 of rod element 11. A spring clip portion 17 of clip 15 serves both to frictionally retain clip 15 in adjusted position along the portion 16 of rod 11 and also retains the fish line as shown in Figs. 1 and 3 to thus determine the effective lever arm of the free portion of the line with respect to pivot 12.

The generally vertical holder 10 is provided with a longitudinal bore 20, which receives an impact pin 21, the pin 21 being normally urged upwardly by a coil spring 22 in the bottom of bore 20. Holder 10 is slotted as at 23, and a pin 24 fixed in impact pin 21 limits end-wise movement of impact pin 21 and prevents its displacement from bore 20.

A latch element 27 is disposed in bifurcation 13 and is pivoted as at 28. Latch element 27 has a latching formation 29 and a cam formation 30. The latch element is normally urged to latching position as illustrated in Fig. 2 by a coil spring 31, which is located in a recess 32 formed in holder 10. Rod 11 is provided with a cam formation 34, which extends downwardly in the region of pivot 12.

It will be noted from the foregoing that rod 11 is perfectly free to oscillate about pivot 12 without restriction until its cam formation 34 meets the cam formation portion 30 of latch element 27. Even after such engagement and during continued counterclockwise rotation of rod 11 the camming action is gradual and gentle and imposes little restraint upon rod element 11 until camming has proceeded to a point where latch formation 29 is released from a shoulder 35 formed in the upper portion of impact pin 21. At this point spring 22 forces impact pin 21 quickly upwardly and, by the time the upper end of the impact pin reaches the under side of rod 11, the pin is moving at a rapid rate so that it strikes against rod 11 and results in a quick yank on the line without forewarning of any kind to the fish.

The dot and dash line illustration in Fig. 2 shows by way of example the approximate downward position which rod element 11 will reach before impact pin 21 is released, and it will be noted that impact pin 21 has very substantial upward movement under the impetus of spring 22 from its full line position to a point where it reaches the dot and dash line position of rod element 11. The impact pin thus has time and distance for attaining a very substantial degree of acceleration before it actually strikes rod element 11.

Pivot 12 is readily removable and may be merely retained by a cotter pin or the like to facilitate removal of the pivot to disassemble rod element 11 from holder 10 without in any way interfering with the latching and impact mechanism. The bottom end of holder 10 may be recessed as shown in Fig. 2 so that the holder may be pivotally supported upon a stake 38 driven into ice or ground, or the holder or stake 38 may be supported on the edge of a boat or in any other desired manner.

What is claimed is:

1. In a fishing device, a holder, a rod element pivoted thereto at an intermediate point, said rod element having outer and inner end portions and a cam formation fixed for joint pivotal movement with said rod element, an impact element movably supported by said holder and having a portion directed toward the outer portion of the rod element, a spring urging said impact element toward said outer rod portion, and latch means engageable to restrain the impact element with the spring in stressed condition, said cam formation being normally out of contact with the latch means to permit free pivotal movement of the rod element and cam formation, said latch means having a portion in the path of pivotal movement of said cam formation whereby said cam formation engages the latch element upon predetermined downward movement of said outer rod portion to release the latch means and free said impact element for upward impingement against said outer rod portion under the impetus of said spring.

2. In a fishing device, a holder, a rod element pivoted thereto for free oscillating movement in a generally vertical plane, said rod element having an outwardly projecting portion and a cam formation fixed for joint pivotal movement with said rod element, an impact element movably supported by said holder and having a portion directed toward the outwardly projecting portion of the rod element, a spring urging said impact element toward said outwardly projecting rod portion and latch means engageable to restrain the impact element with the spring in stressed condition, said cam formation being normally out of contact with the latch means to permit free pivotal movement of the rod element and cam formation, said latch means having a portion in the path of pivotal movement of said cam formation whereby said cam formation engages the latch portion upon predetermined downward movement of said outwardly projecting rod portion to release the latch and free said impact element for upward impingement against said outwardly projecting rod portion under the impetus of said spring.

3. In a fishing device, a holder, a rod element pivoted thereto at an intermediate point, said rod element having outer and inner end portions and a cam formation fixed for joint pivotal movement with said rod element, an impact element movably supported by said holder and having a portion directed toward the outer portion of the rod element, a spring urging said impact element toward said outer rod portion, and latch means engageable to restrain the impact element with the spring in stressed condition, said cam formation being normally out of contact with the latch means to permit free pivotal movement of the rod element and cam formation, said latch means having a portion in the path of pivotal movement of said cam formation whereby said cam formation engages the latch element upon predetermined downward movement of said outer rod portion to release the latch means and free said impact element for upward impingement against said outer rod portion under the impetus of said spring, and a line suspension device adjustable along said outer rod portion to vary the lever arm of said outer rod portion with respect to its pivotal connection to said holder and thus vary the effective force of the cam formation on the latch element in response to a given pull on the line.

MARTIN J. DERKOVITZ.

References Cited in the file of this patent

UNITED STATES PATENTS

| Number | Name | Date |
| --- | --- | --- |
| 309,028 | Byington | Dec. 9, 1884 |
| 371,777 | McCabe | Oct. 18, 1887 |
| 1,747,033 | Shireman | Feb. 11, 1930 |
| 1,792,989 | La Gue | Feb. 17, 1931 |
| 2,144,175 | Zonn | Jan. 17, 1939 |